United States Patent [19]

Johnson et al.

[11] Patent Number: 4,686,719

[45] Date of Patent: Aug. 18, 1987

[54] SEMI-RIGID AIR PALLET TYPE PATIENT MOVER

[75] Inventors: Raynor A. Johnson, Newark, Del.; Jack Wegener, Preston, Md.

[73] Assignee: American Industrial Research, Inc., Newark, Del.

[21] Appl. No.: 734,112

[22] Filed: May 30, 1985

Related U.S. Application Data

[63] Continuation-in-part of Ser. No. 612,836, May 22, 1984, Pat. No. 4,528,704.

[51] Int. Cl.$^4$ .......................... B65G 7/06; A61G 7/06; A61G 7/10
[52] U.S. Cl. ..................................... 5/81 R; 180/125; 414/676; 5/453
[58] Field of Search ............... 5/81 R, 81 B, 453, 454, 5/469, 423, 455; 414/676; 180/125, 124, 116

[56] References Cited

U.S. PATENT DOCUMENTS

3,984,344  4/1976  Johnson et al. ..................... 414/676
4,272,586  6/1981  Wegener et al. ..................... 5/81 R
4,517,690  5/1985  Wegener ................................ 5/81 R

*Primary Examiner*—Alexander Grosz
*Attorney, Agent, or Firm*—Sughrue, Mion, Zinn, Macpeak and Seas

[57] ABSTRACT

An air pallet type patient mover, formed principally by top, intermediate and bottom thin flexible sheets sealed together about their edges and defining a plenum chamber between the intermediate and bottom sheets and a backing member cavity between the top sheet and the intermediate sheet with a semi-rigid backing member within the cavity, supports a patient. Low pressure air within the plenum chamber jacks the load and is discharged through pin hole type perforations within the bottom sheet to create a thin air film. Foam strips within the plenum chamber and extending over a substantial lengthwise extent of the plenum chamber insures air distribution through the plenum chamber. Further, foam strips may be positioned within one of the plenum chamber and the backing member cavity along the sides thereof and outside of the semi-rigid sheet to effect padding and eliminate sharp edges which may interfere with X-ray radiation. The pattern of pin hole type perforations may extend only over the head end of the patient mover bottom thin flexible sheet, with a sealed loop area at the center of the foot end about which air flows to jack the patient's legs to the same level as the patient's torso. Wedge-shaped pillow and foot sections may carry hook and loop type fastener strips end. U-shaped pull straps may be fixed to respective sides of the patient mover.

9 Claims, 9 Drawing Figures

SEMI-RIGID AIR PALLET TYPE PATIENT MOVER

This application is a continuation-in-part application of application Ser. No. 612,836 filed May 22, 1984 now U.S. Pat. No. 4,528,704, entitled "SEMIRIGID AIR PALLET TYPE PATIENT MOVER".

FIELD OF THE INVENTION

The present invention is directed to an air pallet type patient mover, and more particularly, to a semi-rigid patient mover for facilitating transfer of patients to and from hospital beds, gurneys, operating tables, X-ray equipment and the like.

BACKGROUND OF THE INVENTION

The present invention is an outgrowth of the air pallet and air bearing patient mover development set forth in U.S. Pat. No. 3,948,344 entitled "LOW COST AIR PALLET MATERIAL HANDLING SYSTEM" issued Apr. 6, 1976, and U.S. Pat. No. 4,272,856 entitled "DISPOSABLE AIR-BEARING PATIENT MOVER AND VALVE EMPLOYED THEREIN" issued June 16, 1981, both assigned to the common assignee.

Planar air pallets of such type employ at least one flexible material bottom sheet for partially defining a plenum chamber with said one sheet being perforated, as by way of small pin holes, literally in the thousands, over a surface area defined by the imprint of the load, which pin holes face an underlying, generally fixed planar support surface, and wherein the pin holes open unrestrictedly to the interior of the plenum chamber. When the plenum chamber, formed by top and bottom thin flexible sheets, is pressurized by low pressure air, the underlying sheet is in contact over the complete extent of the pin holes with the generally planar support surface. Initially in the air pallet or air pallet type patient mover, the flexible film sheets act like a balloon, and the accumulation of air under pressure initially jacks the load above the top flexible sheet to a given height, whereby the bottom flexible sheet in following the same causes the first row or rows of perforations to lift off the underlying planar support surface, while air also passes through all of the perforations and creates a frictionless air bearing of relatively small height between the underlying support surface and the bottom of the perforated flexible sheet. An equilibrium position is reached where a given number of the perforations rise away from the rigid support structure to permit the air to escape freely from the plenum chamber to the atmosphere and jacking of the load ceases, with the air bearing maintained.

In all air pallets, including patient movers, it is necessary to provide controlled pillowing of the flexible film or films which may totally or partially define the plenum chamber and to thus establish, by jacking the load to a predetermined height, the ability of the air pallet to ride over the surface projections on the underlying support surface. At the same time, excess pressurization of the plenum chamber may cause ballooning of the thin flexible sheet or sheets to an extent where tilting occurs and the load may roll off of the top of the air pallet (or patient mover).

When the load rests on the air pallet prior to pressurization of the plenum chamber, the load tends to press the perforated flexible sheet in contact with the underlying support surface (floor). This prevents the entry of air under light pressure into the plenum chamber and subsequent escape of the air through the perforations to create the air bearing. Air dispersion means are required either interiorly or exteriorly of the plenum chamber, to insure pressurization of the plenum chamber, jacking of the load and subsequent creation of the air bearing. While the air pallet type patient mover of U.S. Pat. No. 4,272,856 has operated satisfactorily, particularly in moving a patient placed thereon and from relatively rigid underlying support surfaces such as those defined by an operating table or a wheeled transport gurney, such patient movers do not have universal application in hospitals, and particular requirements must be met for utilizing air pallet type patient movers peculiar to operating room requirements, X-ray machines, and apparatus where the patient is maintained in positions other than flat. In all such applications, it must be kept in mind that the patient's body is of irregular configuration in addition to the fact that the mass of the patient is also irregularly distributed, i.e. the central torso is much heavier than the head at one end or the legs at the opposite end of the torso. Care must be taken to insure the patient's comfort during transport, and while on the operating table, X-ray machine support, etc.

It is, therefore, a primary object of the present invention to provide an improved air bearing type patient mover which is particularly applicable for moving the patient to and from various underlying generally rigid support surfaces, particularly where those surfaces may be changed to and from a flat horizontal configuration, where the air bearing surface area is matched to the mass geography of the patient, wherein the patient mover includes means for ready hand grasping from either side to facilitate effortless movement of the patient on the patient mover supported by the air bearing defined by the perforated pattern area, and wherein air distribution to the plenum chamber, jacking of the patient, and the creation of a frictionless air film bearing beneath and bottom thin flexible sheet and at the perforated pattern area is assured.

DESCRIPTION OF THE PREFERRED EMBODIMENT

In the various embodiments of the patient mover within the application, like numerals are employed for like elements.

Figure 1:
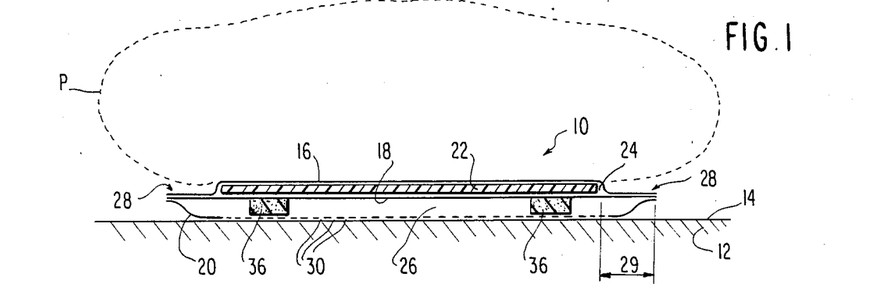
FIG. 1 is a transverse vertical sectional view of a semi-rigid air pallet type patient mover, prior to air pressurization, and forming one embodiment of the present invention.
Figure 2:
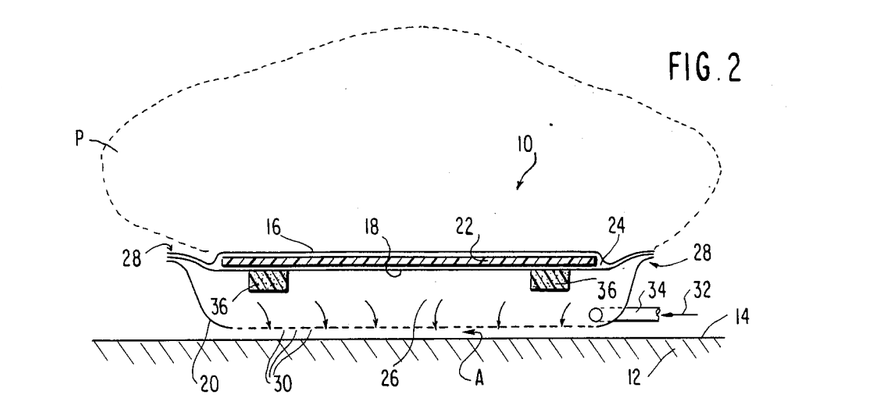
FIG. 2 is a similar transverse vertical sectional view of the patient mover of FIG. 1 after air pressurization and creation of an air bearing between the patient mover and an underlying rigid support surface.

There is shown, in FIGS. 1 and 2, a patient mover, indicated generally at 10, for use with a heart catheter machine, only a flat planar support member 12 of that machine being illustrated and providing a generally fixed planar support surface 14. The patient mover 10 is formed principally of an upper or top thin flexible sheet 16, a middle or intermediate thin flexible sheet 18, and a bottom thin flexible sheet 20. A semi-rigid sheet or board 22, which may be formed of plastic or the like, is positioned within a pocket 24 formed by the top thin flexible sheet and the intermediate thin flexible sheet 18 and defines a generally rigid backing member. The thin flexible sheets, as at 16, 18, 20, may be formed of an electrically conductive sheet material, such as that manufactured by the Herculite Corporation under the trademark LECTROLITE. This material is particularly useful in the manufacture of medical products for hospital use and is constituted by a nylon scrim with a vinyl coating on both sides thereof so as to embed the scrim within the vinyl. As such, it is impossible to have static electricity build up on the patient mover 10.

Preferably, the thin flexible sheets 16, 18 and 20 are sewn or otherwise line sealed together at predetermined positions, to join the sheets and particularly to create sealed chambers or cavities therebetween. The chamber or cavity 24, which is open at one end and formed between the top thin flexible sheet 16 and the middle thin flexible sheet 18, permits the sliding entry and removal of the semi-rigid plastic sheet or board 22. Additionally, between the intermediate or middle sheet 18 and the bottom thin flexible sheet 20, there is formed a plenum chamber indicated generally at 26. Stitching, whether single or double, as indicated generally at 28, is formed preferably of conductive thread such as a conductive nylon resin thread. Alternatively, the thin flexible sheets may be heat sealed together by localized aligned application of heat to thermobond the sheets along given lines.

It should be noted that the patient mover 10 is quite similar in many respects to that shown in FIGS. 1-3 inclusive of prior application Ser. No. 612,836 now U.S. Pat. No. 4,528,704. In that respect, the semi-rigid sheet 22 is of a width less than the width of the plenum chamber 26 although it may be laterally sized perfectly to chamber 24 defined by top thin flexible sheet 16 and intermediate thin flexible sheet 18. The purpose of this, as in accordance with pending application Ser. No. 612,836, now U.S. Pat. No. 4,528,704 is to leave gaps 29 of approximately one-half inch to each side of the plenum chamber 26 running longitudinally of the patient mover 10, whereupon, if the load (patient) were sufficiently narrow as to cover laterally the extent of the patient mover equal to the width of the semi-rigid sheet 22, the areas defined by gaps 29 to each side within the plenum chamber and laterally to respective sides of the thin flexible sheet 18, outwardly of the sides of the semi-rigid sheet 22, function as internal air distribution means to insure full air pressurization of plenum chamber 26 prior to the formation of the air bearing A. In that respect, the bottom thin flexible sheet 20 is provided with a central area of pin hole type perforations as at 30 which open unrestrictedly internally to the plenum chamber 26 and to the outside of the bottom thin flexible sheet 20.

Where the patient mover 10 is employed in supporting the patient on the heat catheter apparatus and specifically on support member 12, the patient mover is required to be moved axially along its longitudinal axis, i.e. into and out of the plane of the paper FIGS. 1 and 2. Under normal circumstances, where the load is not wider than the rigid backing member, the semi-rigid sheet 22 functioning as the rigid backing member for the patient P, the flow is maintained through the plenum chamber of air from a source indicated generally by arrow 32 and through an inlet tube 34 of the plenum chamber at one end. The air flow tends to move quickly through the plenum chamber, jacking up the load, i.e. the patient P, and creating an air bearing by the escape of air as at A, FIG. 2.

If the plenum chamber is narrower than the load, then one tends to sandwich or seal off those flow passages at gaps 29 along the sides of the plenum chamber, even though the semi-rigid board sheet 22 is somewhat narrower than the plenum chamber 26. In the heart catheter which will accept an air pallet or its equivalent as at 10 which is at a maximum 14" wide and wherein the load defined by the patient averages 17" to 22" wide with the load being flexible, the result of this is for the patient P to initially seal off, particularly in the torso area, air passage through the patient mover plenum chamber 26. Assuming air is applied at the head end of the patient mover, the result is to initially pillow up the head and shoulders of the patient P. However, the hip completely seals off plenum chamber 26 and prevents air dispersion along the sides of the plenum chamber 26, i.e. at gaps 29, because the side overflow of the patient at the hip insures the complete sealing off of that plenum chamber portion in the area of the hip. However, air is being applied under pressure, and suddenly the flow gets by the hip and the air all rushes out of the head end, filling the foot end of the patient mover plenum chamber. The feet are jacked up. The head falls down. An oscillation is set up with air flow oscillating back and forth between the head end and foot end of the plenum chamber 26.

In the air pallet 10, as illustrated in FIGS. 1 and 2, this embodiment of the invention utilizes, preferably, a pair of laterally spaced, longitudinally disposed foam strips 36, which may be of rectangular cross-section and adhesively fixed or thermobonded to the bottom of the thin intermediate sheet 18, preferably laterally inside of the outer edges of the generally rigid backing sheet 22. The foam strips 36 may be formed of an open pore foam materials so that air flow may pass through the foam while at the same time the blocks of foam 22 tend to prevent complete flattening of the thin flexible bottom sheet 20 against the thin flexible intermediate sheet 18 and the complete collapse of the plenum chamber 26.

In the simplified, alternative form, a center foam strip may be employed aligned with the longitudinal center line of the patient P supported by the air pallet type patient mover 20.

The foam strip or strips 36 are extremely valuable and useful. Foam is light weight and adds little to the mass of the patient mover 20. Further, by spacing the strips laterally and orienting them relative to the patient P, the result is to use the foam strips even when collapsed under the weight of the patient to cup the patient inwardly from side to side to some minor degree and thereby facilitating in the prevention of patient roll-off during jacking of the load upwardly. Upon air pressurization of plenum chamber 26 and the creation of the air bearing A by the escape of air through the perforations 30.

With respect to the embodiment of FIGS. 1 and 2, those figures are transverse sectional views of the patient mover 10 under conditions where there is no air supply to the plenum chamber and where air is supplied to effect jacking of the load and creation of the air bearing, respectively. While this is only a partial showing of the air pallet and highlights the novel content therein, it should be kept in mind that the construction of the patient mover 10 in many respects is very similar to that of the patient mover 10' in the further embodiment of FIGS. 3-5 inclusive.

Figure 3:
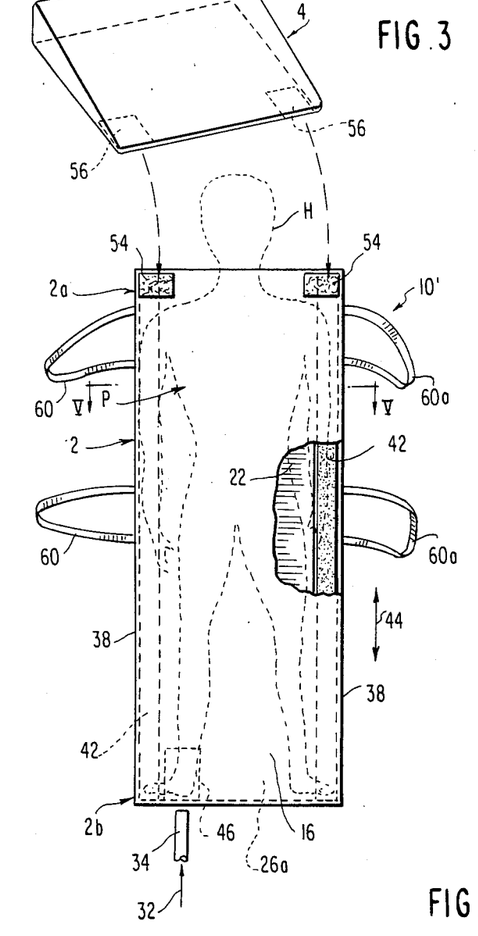
FIG. 3 is a top plan view, partially broken away, of a semi-rigid air pallet type patient mover forming a further embodiment of the invention.
Figure 4:
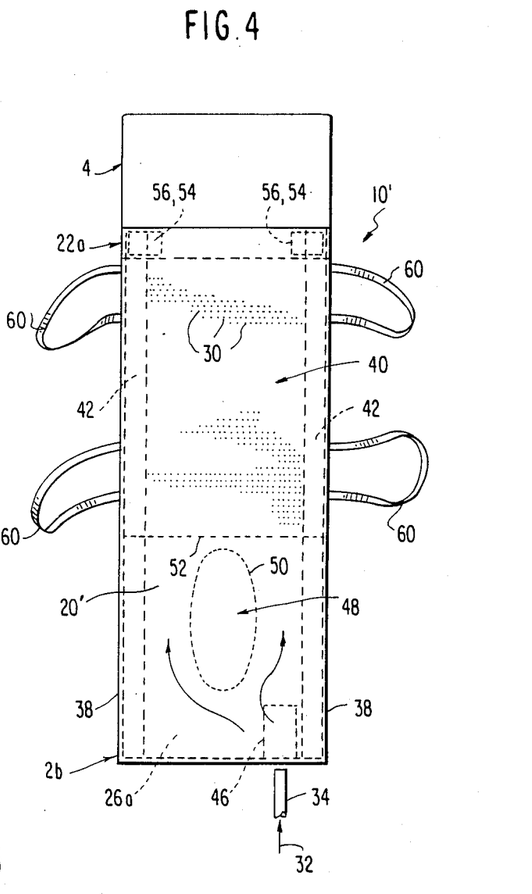
FIG. 4 is a bottom plan view of the patient mover of FIG. 3.
Figure 5:
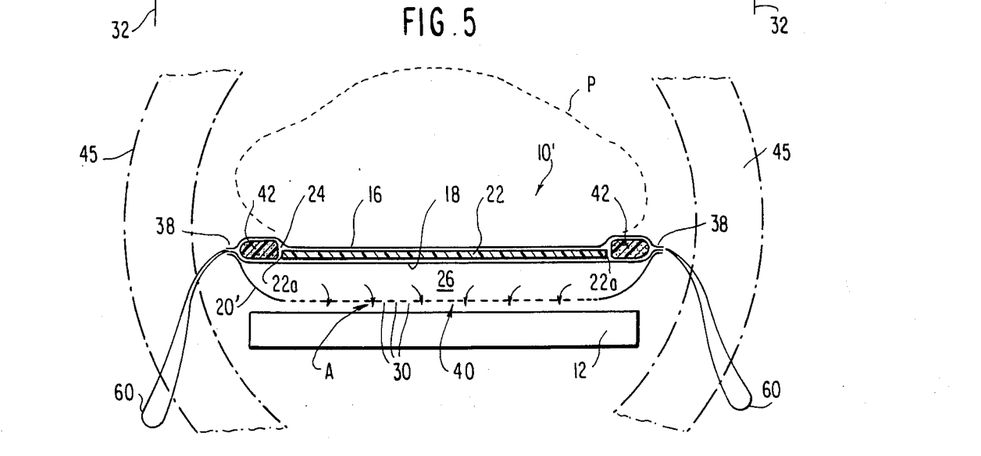
FIG. 5 is a transverse, sectional view of the patient mover of FIG. 3 taken about line V—V.

In these figures, the patient mover 10' is used in a cat scan unit and has certain special requirements necessary to the nature in which the patient P is positioned within the cat scan unit and particularly the X-ray portion thereof, so that X-rays may be made in a quick, efficient manner with the patient purposely positioned relative to the X-ray gun thereof. In the patient movers of U.S. Pat. No. 4,272,856 and copending patent application Ser. No. 612,836 now U.S. Pat. No. 4,528,704, purposely the various thin flexible sheet materials at their lateral outboard edges throughout the longitudinal extent of the patient mover have been sewn together to create longitudinally extending, narrow areas as hand grips. The nurses or other hospital attendants may grasp the edges with both hands at longitudinally spaced positions and with the plenum chamber pressurized and air bearing created, an almost effortless movement of the patient mover and the patient may be effected. Further, these edge strips formed by multiple layers of thin film material are laterally exterior of the chamber or cavity bearing the generally rigid backing member (semi-rigid plastic sheet). These edge portions at the cat scan area provide relatively thin rectangular edges where artifacts can hit, and as the patient support member revolves, the radiation in hitting the sharp edges sends lines across the picture distorting the X-ray picture of the cat scan unit. Therefore, for a patient mover to be employable in a cat scan, we have determined that it is necessary to round the edge and to soften the sharp edge to minimize the effect of the edge on the radiation lines.

Turning to FIGS. 3-5 inclusive, it is noted that again the patient mover 10' is comprised of a top, thin flexible sheet 16', an intermediate thin flexible sheet 18 and a bottom thin flexible sheet 20', the bottom thin flexible sheet being perforated in a given pattern area as indicated best in FIG. 4 at 40, by literally thousands of pin hole type perforations 30. Further, the top and intermediate sheets define a chamber or cavity 24 within which is positioned a generally rigid backing member, in the form of a semi-rigid plastic sheet 22 whose lateral width is less than that of the plenum chamber 26.

To insure rounding of the outer edge as at the seam line 38 where the lateral edges of the sheets 16, 18 and 20 are sealably connected, this embodiment of the invention employs a pair of foam strips 42 which are located within the pocket or cavity 24 and between the side edges 22a of the semi-rigid plastic sheet 22 and seal line 38. The foam strips 42 extend the complete length of the patient mover main body 2, FIG. 3. Each foam strip 42 may be several inches wide and an inch or more in height. Additionally, the foam strips are readily compressible, unlike the generally rigid backing member 22, and perform additional functions as the air distribution means since the generally rigid backing member 22 is narrower than the plenum chamber 26 underlying the same. When air pressurization is effected through tube 34 via an air stream indicated at arrow 32, the presence of the air within the plenum chamber 26 will bring the corners of the plenum chamber 26 up and around the foam, i.e. the air dispersion means 42. However, there will no significant interference with the radiation pattern and the deflection of that pattern to send lines across the picture distorting the X-ray pictures of the unit.

FIG. 3 shows another aspect of the invention. It should be kept in mind that in this embodiment the patient mover 10' is moved in the direction of its longitudinal axis, as indicated by arrow 44, into and out of such that the patient is propelled head first into the interior of the scanning area defined by the annulus 45 through which the underlying generally rigid support member 12 of the cat scan apparatus projects and retracts.

While the illustrated embodiment shows foam strips 42 within pocket or cavity 24 to opposite sides of the generally rigid backing member 18, there may be employed a foam sheet which completely overlies the generally rigid backing member, is laterally wider or equal in width to the generally rigid backing member 22, with its functions dual. That is, it provides some comfort to the patient P lying on the generally rigid backing member 22 as well as preventing the creation of sharp edges which have an adverse effect on the radiation being directed through the patient in order to effect the taking of the X-ray pictures.

As may be appreciated by reference to FIGS. 3 and 4, of necessity, the low pressure air, as indicated schematically by arrow 32, must enter the patient mover 10' at the foot end 2b of the main element 2 rather than the head end 2a. A valved air inlet as at 46, at that end, permits air entry into the bottom portion of the plenum chamber 26a, FIG. 4. It should be noted, however, that in the bottom plan view of FIG. 4, an oval area 48 of the patient mover is sealed off by way of an oval seal line 50 and the patient mover 10' main section 2 is figuratively split longitudinally in half transversely, as indicated schematically by a dotted line 52 going completely across. Further, the foot end 2b of the thin flexible sheet 20 is non-perforated. Further, this is seen by comparison of FIGS. 3 and 4 at the areas where the legs of the patient P rest. Pressurized air 32 entering the plenum chamber 26 at air inlet 46 results in air distribution through the plenum chamber 26 at the bottom of the patient mover to jack the patient's legs upwardly although there is no air bearing created beneath the patient's legs. Further, due to the air dispersion means effected by the generally rigid backing member and/or foam strips 42, air readily passes towards the head end 2a of the main unit 2, exiting through the perforations 30 and creating the air bearing A between the bottom thin flexible sheet 20 and the top of the generally rigid support member 12. Jacking of the patient P occurs progressively from foot to head, the bottom entry of the air permits the patient's head H, FIG. 3, to be inserted into the interior of the cat scan, i.e. that portion of the machine known as the doughnut or annulus 45. The occurrence of an air inlet as at 46 at the head end 2a of the main unit 2 would block the entry of the cat scan patient mover 10 and the patient to the interior of the annulus 45.

The patient mover 10 in FIGS. 3-5 incorporates a second element constituting a removable pillow, indicated generally at 4, which is wedge-shaped, longitudinally and is of a width equal to that of the main patient mover body or section 2. In that respect, as shown in FIG. 3, at the head end 2a of the main body 2, a pair of hook and loop type fastener strips 54 such as the ones sold under the trademark VELCRO are sewn or adhesively affixed to the top thin flexible sheet. Pillow 4 which may have a foam interior and a plastic sheet exterior, carries cooperating VELCRO hook and loop type fastener strips 56 sized to those of strips 54, fixed to the bottom of the pillow 4. Strips 56 are engageable with strips 54 to removably lock the pillow 4 at the head end of the main body 2 to that body. Once the patient is positioned on the generally rigid underlying support surface member 12, that member may be moved in the direction of the head, i.e. as shown by arrow 44, FIG. 3, such that the head H of patient P is projected into the cat scan unit X-ray portion of the machine. However, prior to moving the support member or carriage 12, the pillow 4 is removed by detaching strips 56 from those at 54, and the patient's head H is then clamped or otherwise held in position within the cat scan unit so that it cannot move during the taking of X-rays.

To facilitate lateral movement of the patient once the air bearing A has been achieved, the patient mover 10' is provided with a pair of U-straps along each side edge of the patient mover as defined by seal lines 38. The U-straps 60 are positioned longitudinally at or adjacent the shoulder of the patient P and in the area of the patient's hip. The U-straps are preferably 8" to 10" in length, that is, they extend away from the seams 38 by those distances to facilitate lateral pull of the patient mover without an attempt to lift the patient mover 10' off the underlying rigid support member or carriage 12 during such movement. By having the U-straps 60 of sufficient length, the pull vectors are principally in the horizontal direction, thereby pulling the patient laterally rather than at right angles thereto or vertically upward, thereby minimizing disturbance of the patient P. A light pulling force is given with the patient P in place. Only a very light force is required because the patient is literally riding on a film of air A, FIG. 5, during this process.

Figure 7:
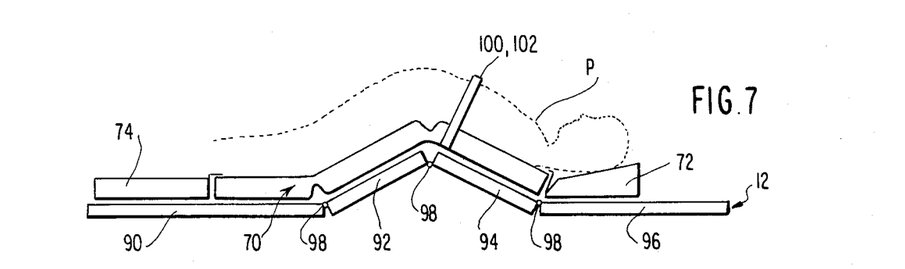
FIG. 7 is a side elevational view thereof where portions of the operating table are raised into anvil shape with the patient mover and patient thereon conforming to that configuration.
Figure 8:
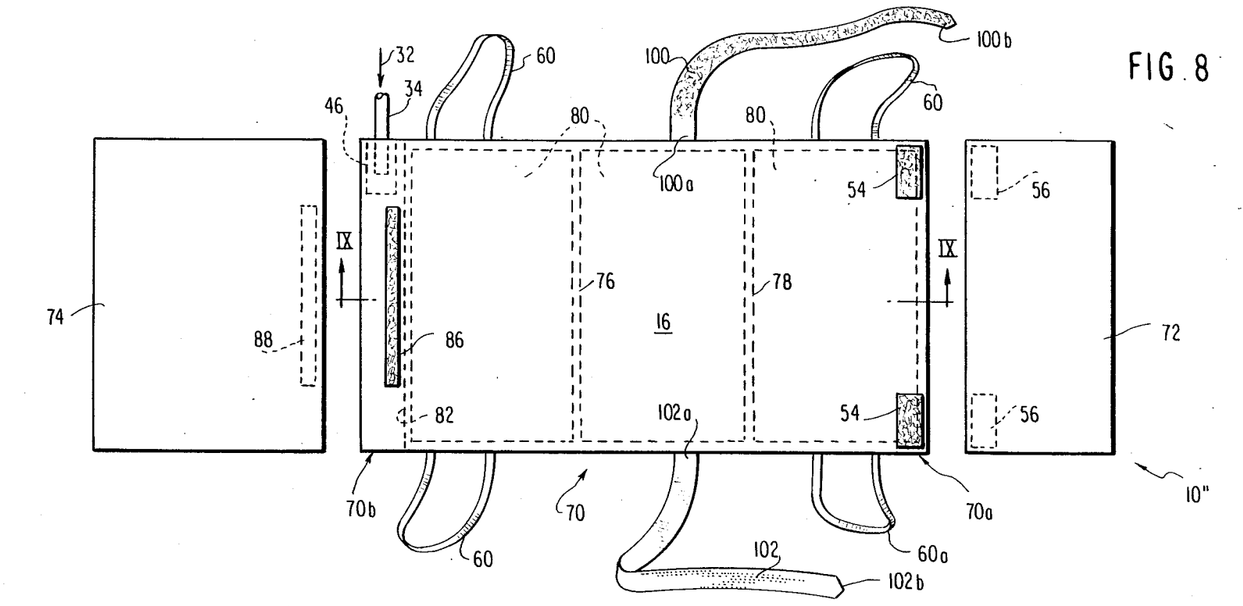
FIG. 8 is a top plan view of the patient mover of FIGS. 6 and 7.
Figure 9:
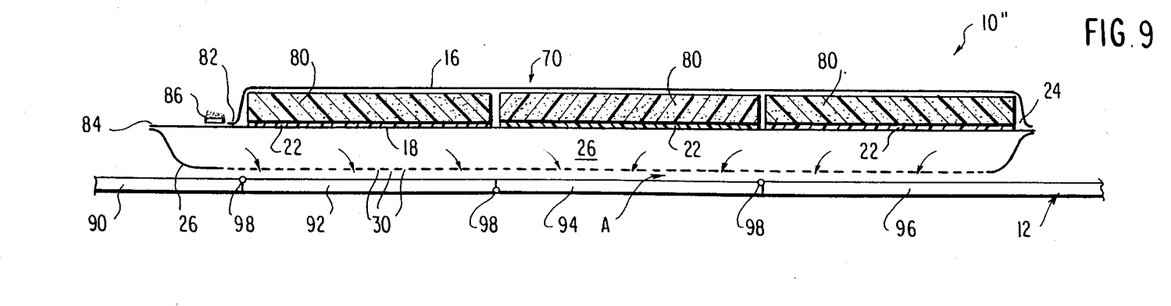
FIG. 9 is a longitudinal vertical sectional view of the patient mover of FIG. 8 taken about line IX—IX.

Referring next to FIGS. 6-9 inclusive, there is shown a further embodiment of the invention wherein the patient mover, indicated generally at 10" is comprised of a middle torso section 70. A pillow as at 72 and a foot section as at 74 are detachably coupled respectively to head end 70a and foot end 70b of the torso section 70. Further, only the torso section includes a plenum chamber 26 and thus, it is only beneath that section that an air bearing A, FIG. 9, is formed, as a result of air pressurization of the plenum chamber. The patient mover 10" is particularly useful as an operating room patient mover. It is especially designed so it is sectional with the detachable head section or pillow 72 and the detachable foot section 74 being readily attached to and detached from opposite ends of the middle torso section 70.

As may be appreciated by reference to FIG. 8, insofar as the middle torso section 70 is concerned, again this section is formed of three thin flexible sheets: a top thin flexible sheet 16, an intermediate thin flexible sheet 18, and a bottom thin flexible sheet 20 bearing literally thousands of pin hole type perforations as at 30 within a portion of the bottom thin flexible sheet bounded by non-perforated edge portions as at 20a, FIG. 8. The perforations 30 are over the complete bottom of the middle torso section, and thus under the bulk of the load created by patient P.

The embodiment is characterized by the middle torso section 70 being, in turn, bendable about two fold lines in three parts to modify the configuration of the patient P. In that respect, the semi-rigid backing member is formed by three separate or edge joined semi-rigid plastic sheets as at 22 and positioned within cavity or chamber 24 defined by edge sealed top and intermediate thin flexible sheets 16, 18. Additionally, positioned within cavity or chamber 24, are foam blocks 80 of rectangular plan configuration sized identical to the semi-rigid plastic sheets 22 so as to facilitate the bending of the three part middle torso section 70 of patient mover 10".

The bottom thin flexible sheet 20 is likewise edge sealed commonly with the edges of the upper two sheets 16 and 18 at the head end and along both sides, but not at the foot end. At the foot end, the top thin flexible sheet 16 is heat sealed laterally to the intermediate thin flexible sheet 18 along seal line 82 while the thin flexible intermediate sheet is heat sealed to the bottom thin flexible sheet 20 about a seal line 84 rearwardly thereof, thereby forming an extension to the plenum chamber 26 opening to the plenum chamber 26 and functioning to facilitate air dispersion to the interior of the plenum chamber when compressed air, as indicated by arrow 32, is supplied via a tube 34 to a suitable air inlet 46 within this portion of the middle torso section 70. The head section or pillow 72 may be identical to that shown in the embodiment of FIGS. 3-5, being constituted of a wedge-shaped foam core covered by suitable plastic flexible film material which may be identical to that making up the three films 16, 18 and 20 of the torso section 70. Additionally, Velcro strips 54 are provided on the wedge pillow at the corners thereof and cooperative mating hook and loop type fastener strips 54 such as the one sold under the trademark VELCRO are borne by the top thin flexible film 16 at the head end 70a of that unit.

Additionally, an elongated rather narrow hook and loop type fastener strip 86 such as the one sold under the trademark VELCRO is provided to the top thin flexible film sheet 16 adjacent seal line 82 and engages mating VELCRO strip 88 on the bottom of foot section 74, the foot section 74 also being constituted preferably by a foam block covered by thin flexible film material in the manner of the wedge-shaped pillow or head section 72. As may be seen, air pressurization of plenum chamber 26 and the creation of the air bearing A by the escape of air through perforations 30 after jacking the load (patient P) vertically upward, may be effected without disturbance by the physically attached foot section, via strips 86, 88.

Figure 6:
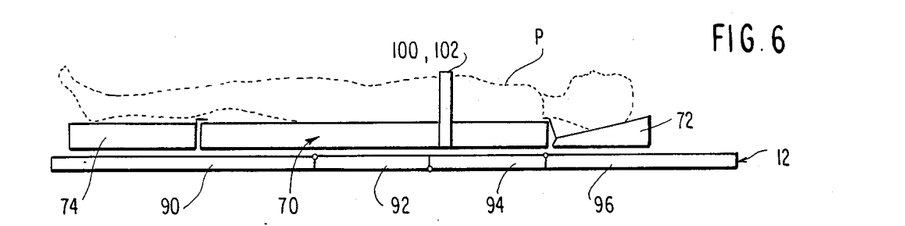
FIG. 6 is a side elevational view of a semi-rigid air pallet type patient mover forming yet another embodiment of the present invention, particularly adapted to operating room use.

The utility of the operating room patient mover may be seen by contrasting FIGS. 6 and 7. It may be somewhat difficult to appreciate the fact that the middle torso section is indeed purposely made so as to be able to bend at two transverse bend lines 76, 78, when in fact this very torso section 70 bears the patient's spine and the spine is a relatively rigid member. The body bends at the bottom of the spine and, of course, at the top of the spine where the neck joins the head to the shoulders. Further, of course, the legs bend at the knees. In the operating room, it is customary to achieve by a mechanism associated with the operating table indicated generally at 12, an anvil shaped configuration as seen in FIG. 7 as a result of an upward thrust of two sections 92, 94 of the table relative to other portions which remain horizontal.

As seen in FIG. 8, the table may be comprised of four hinge joined sections as at 90, 92, 94 and 96, joined by hinges 98. By hydraulic motor means (not shown), the sections 92 and 94 may be thrust upwardly as shown in FIG. 7 into A or anvil form so that the torso is literally hanging over the point generated by the two operating table sections 92, 94.

It is noted that the middle torso section 70 is provided with paired U-straps, loops or handles 60 at head end 70a and foot end 70b as at 60 in accordance with the embodiment of FIGS. 3-5 inclusive. In this embodiment as well as that of FIGS. 3-5, extreme care must be taken in moving the patient from the gurney onto the operating table and vice versa. Gurneys are generally 24" in width, and in making a patient transfer, the gurney is brought alongside the operating table. For safety reasons, one pulls the patient P laterally in a direction away from the gurney and onto the stationary operating table (or alternate underlying generally rigid support member), thus, standing in the direction one is pulling, i.e. moving the patient. This keeps the gurney from rolling away and insures the safety of the patient during transfer.

Importantly, if only short handles or loops 60 are provided, and if the patient is pulled by reaching across the operating table grasping the short handles, the pull is more upwards than horizontal, i.e. lateral. Any upward lift on the torso middle section 70 in the embodiment of FIGS. 6-9 inclusive causes more air to exhaust unobstructedly from the plenum chamber 26 through the free perforations 30, the effect of which is adverse to the frictionless ride desired. At the same time, this puts a tremendous amount of strain on the shoulder and back muscles of the hospital personnel, such as the nurse or attendant attempting to pull the patient off the gurney and onto the operating table 12.

By using handles which are 8" to 10" in length, the hospital personnel palms of the hands are maintained in generally the same plane as the gurney and operating table. This maintains a uniform balance of air within the plenum chamber, and there is no cause for its escape other than under normal air bearing operation with a thin several mil air bearing A being maintained on the gurney and on the top of the operating table 12 as the patient is moved onto that underlying generally rigid support surface.

It has been determined that the length of the handles or straps 60 should be such that when the straps 60 fall freely from the area of their juncture with seams 28, for instance, in FIG. 5, 38, the outboard ends 60a of the straps should just reach the area of perforations 30 within the underlying thin flexible sheet 20. Thus, the desirable length of the handle is about the same distance as from the point of attachment of the handles or straps to the pattern of the perforations within the bottom thin flexible sheet.

Where it becomes necessary to insure that the patient is securely fastened to the patient mover, it is desirable to include one or several pairs of hook and loop type fastener straps such as the one sold under the trademark VELCRO, as at 100, 102, sewn at one end to respective sides of the patient mover such as patient mover middle torso section 70, FIG. 8, as at 100a, 102a, the straps bearing hooks on the top of one of the straps as for instance strap 100, while mating loop material is applied over the full length of the other strap 102 on its bottom. Then, the mating surface portions of the straps may be held together by means of the hook and loop type material carried thereby. The straps should be of a sufficient length such that the outer ends 100b and 102b in fact overlap to secure the patient in place on top of the middle torso section of the patient mover.

The present invention has further application to patient movers peculiarly employed in the emergency room. Such patient mover is preferably formed to include a semi-rigid or in fact virtually rigid plastic sheet or the like fitted to a cavity or pocket defined by the upper thin flexible sheet and intermediate thin flexible sheet as in the illustrated embodiments. However, the rigid sheet should be broken or hinged so that the patient mover can be bent in the power position, i.e. at the small of the back of the patient carried thereby. During transport of patients, they generally raise the patient to the power position to prevent fluids from building up in the lungs. As such the gurneys are purposely made to permit raising the patient at the small of the back, so that his head is above the body. Additionally, while we have discussed the utilization of foam blocks in addition to the rigid or semi-rigid plastic sheet in unitary or segemented form, the thickness of the foam pads may vary. The foam is employed for comfort and, of course, utilizing relatively thick pads of foam insures that the patient is most comfortable during transport or when on the operating table and the like. In the emergency room, it may be preferable to keep the pad very thin since the patient should be kept rigid until a diagnosis can be made. In such case, the foam pad should be relatively thin if employed at all, and straps such as straps 100, 102 are required to strap the patient in and to prevent unnecessary movement of the patient on the patient mover.

In accordance with copending application Ser. No. 612,836 now U.S. Pat. No. 4,528,704, and in accordance with our earlier U.S. Pat. No. 4,272,856, the medical patient should be supported by a generally rigid planar backing member. The patient mover is required to create an air bearing between the bottom thin flexible sheet having perforations unrestrictedly opening interiorly and exteriorly of that sheet and should be positioned over an underlying generally planar fixed support surface such as an operating table, gurney or the like. Preferably, the patient mover is formed of three thin flexible sheets including a top and intermediate sheet defining a cavity or pocket for carrying the generally rigid planar backing member so as to underlie the patient. The plenum chamber, of course, is defined by edge sealed bottom thin flexible sheet and the intermediate thin flexible sheet and the central portion thereof bears thousands of small diameter pin hole type perforations with a non-perforated portion about the perforation pattern upwardly to the seal line or stitching joining the sheets together and defining the plenum chamber. As such, these means control both pillowing of the flexible material to permit jacking of the backing member and the medical patient sufficient to permit the patient mover to accommodate surface irregularities for both the load support surface and the backing member, while preventing ballooning of the flexible material. Air inlet means are required for air pressurization of the plenum chamber and internal or external air dispersion means are required to insure air flow throughout the chamber when the patient mover is under load at the time of air pressurization of the plenum chamber. Certain of these aspects have not been treated extensively in this application. However, reference may be had to copending application Ser. No. 612,836 now U.S. Pat. No. 4,528,704 whose content is incorporated by reference herein, as to those respects.

While the invention has been particularly shown and described with respect to preferred embodiments thereof, it will be understood by those skilled in the art that the foregoing and other changes in form and details may be made therein without departing from the spirit and scope of the invention.

What is claimed is:

1. An air pallet type patient mover for frictionless movement of a patient over a relatively fixed support surface, said patient mover comprising:
   top, intermediate and bottom thin flexible sheets,
   means for sealing given sheets together linearly to define a plenum chamber between said intermediate and bottom sheets and a backing member cavity between the top sheet and said intermediate sheet,
   said bottom thin flexible sheet including a portion defined by the footprint of the load having a plurality of closely spaced small diameter pin hole type perforations opening directly into the plenum chamber and directly onto said support surface,
   air inlet means communicating with said plenum chamber at one end thereof for permitting low pressure air pressurization of the plenum chamber for initially jacking of the load and for subsequent discharge through the perforations to create a thin air film between the bottom thin flexible sheet and the support surface,
   a semi-rigid backing member within said backing member cavity supporting said load and extending generally the length of said patient mover,
   means for dispersion of air throughout said plenum chamber when the air pallet is under load during air pressurization of said plenum chamber,
   the improvement wherein said air dispersion means comprises a pair of parallel foam strips within one of said plenum chamber and said backing chamber cavity, laterally spaced and extending over a substantial longitudinal extent of said plenum chamber so as to insure air distribution through said plenum chamber under conditions where the patient is wider over at least a portion of his body than the generally rigid backing member and the plenum chamber, and wherein under load, the patient tends to compress the foam strips, causing the generally rigid backing member to flex about the patient to cradle said patient at least prior to full pressurization of said plenum chamber and creation of the air bearing.

2. The air pallet type patient mover as claimed in claim 1, wherein said patient mover has a head end and a foot end, said bottom thin flexible sheet has pin hole type perforations extending over a surface portion of approximately one-half its length at said head end with said foot end thereof being nonperforated, wherein said intermediate and bottom thin flexible sheets are sealed together in central loop form over a significant portion of the non-perforated foot end of the patient mover, and wherein said air inlet is within the foot end of the patient mover such that low pressure air supplied to the said air inlet passes to opposite sides of the sealed loop area of said non-perforated foot end portion to the plenum chamber portion including pin hole type perforations within the bottom thin flexible sheet for sequential jacking of the patient from the foot end to the head end of the patient mover, thereby maximizing the air bearing under the torso of the patient, while providing a non-air-bearing portion underlying the legs of the patient with jacking of the patient legs to the level of the torso overlying the plenum chamber portion defined by the pin hole type perforations within the bottom thin flexible sheet.

3. An air pallet type patient mover for frictionless movement of a patient over a relatively fixed support surface, said patient mover comprising:
   top, intermediate and bottom thin flexible sheets,
   means for sealing given sheets together linearly to define a plenum chamber between said intermediate and bottom sheets and a backing member cavity between the top sheet and said intermediate sheet,
   said bottom thin flexible sheet including a portion defined by the footprint of the load having a plurality of closely spaced small diameter pin hole type perforations opening directly into the plenum chamber and directly onto said support surface,
   air inlet means communicating with said plenum chamber at one end thereof for permitting low pressure air pressurization of the plenum chamber for initially jacking of the load and for subsequent discharge through the perforations to create a thin air film between the bottom thin flexible sheet and the support surface,
   a semi-rigid backing member within said backing member cavity supporting said load and extending generally the length of said patient mover,
   means for dispersion of air throughout said plenum chamber when the air pallet is under load during air pressurization of said plenum chamber,
   the improvement wherein said semi-rigid sheet is of a width less than the lateral width of said plenum chamber, and wherein foam strips extend longitudinally within one of said plenum chamber and said at least one backing member cavity between said top sheet and said intermediate sheet along the sides thereof outside of said semi-rigid sheet to effect padding completely along the lateral edges of the air pallet type patient mover to eliminate sharp edges at the sides of the patient mover and to thereby minimize the effect of the patient mover edges on radiation lines when said air pallet type patient mover is employed in supporting the patient during X-ray radiation within a cat scan unit or the like.

4. The air pallet type patient mover as claimed in claim 3, wherein said patient mover has a head end and a foot end, said bottom thin flexible sheet has pin hole type perforations extending over a surface portion of approximately one-half its length at said head end with said foot end thereof being nonperforated, wherein said intermediate and bottom thin flexible sheets are sealed together in central loop form over a significant portion of the non-perforated foot end of the patient mover, and wherein said air inlet is within the foot end of the patient mover such that low pressure air supplied to the said air inlet passes to opposite sides of the sealed loop area of said non-perforated foot end portion to the plenum chamber portion including pin hole type perforations within the bottom thin flexible sheet for sequential jacking of the patient from the foot end to the head end of the patient mover, thereby maximizing the air bearing under the torso of the patient, while providing a non-air-bearing portion underlying the legs of the patient with jacking of the patient legs to the level of the torso of the patient overlying the plenum chamber portion defined by the pin hole type perforations within the bottom thin flexible sheet.

5. An air pallet type patient mover for frictionless movement of a patient over a relatively fixed support surface, said patient mover comprising:

top, intermediate and bottom thin flexible sheets, means for sealing given sheets together linearly to define a plenum chamber between said intermediate and bottom sheets and a backing member cavity between the top sheet and said intermediate sheet, said bottom thin flexible sheet including a portion defined by the footprint of the load having a plurality of closely spaced small diameter pin hole type perforations opening directly into the plenum chamber and directly onto said support surface, air inlet means communicating with said plenum chamber at one end thereof for permitting low pressure air pressurization of the plenum chamber for initially jacking of the load and for subsequent discharge through the perforations to create a thin air film between the bottom thin flexible sheet and the support surface, a semi-rigid backing member within said backing member cavity supporting said load and extending generally the length of said patient mover, the improvement wherein said patient mover has a head end and a foot end, said bottom thin flexible sheet has pin hole type perforations extending over a surface portion of approximately one-half of its length at said head end with said foot end thereof being non-perforated, wherein said intermediate and bottom thin flexible sheets are sealed together in a central loop form over a significant portion of the non-perforated foot end of the patient mover, and wherein said air inlet is within the foot end of the patient mover such that low pressure air supplied to said air inlet passes to opposite sides of the sealed loop area of said non-perforated foot end portion to the plenum chamber portion including pin hole type perforations within the bottom thin flexible sheet for sequential jacking of the patient from the foot end to the head end of the patient mover, thereby maximizing the air bearing under the torso of the patient while providing a non-air-bearing portion underlying the legs of the patient with jacking of the patient's legs to the same level as the patient's torso at the plenum chamber portion defined by the pin hole type perforations within the bottom thin flexible sheet.

6. The air pallet type patient mover as claimed in claim 5, further comprising a detachable pillow of wedge-shaped configuration and at least one interengageable hook and loop type fastener strip means fixed to each of; the edge of the patient mover at the head end and said wedge-shaped pillow, respectively, for effecting a detachable coupling between the wedge-shaped pillow and the head end of the air pallet type patient mover.

7. The air pallet type patient mover as claimed in claim 5, further comprising a pair of pull straps fixed to respective sides of the patient mover at the seal line between the thin flexible sheets and extending outwardly thereof at positions proximate to the shoulder and hips of the patient carried thereby, said straps being of a length approximately equal to the distance between the edge seal line between the bottom thin flexible sheet and the intermediate thin flexible sheet and the first row of perforations within said bottom thin flexible sheet at the sides of the patient mover.

8. The air pallet type patient mover as claimed in claim 7, wherein said straps are U-shaped, having their ends fixedly coupled to the longitudinal edges of said air pallet type patient mover.

9. The air pallet type patient mover as claimed in claim 8, further comprising a foot section detachable connected to the air pallet type patient mover to the foot end of the air pallet type patient mover, said foot section comprising a wedge-shaped, foam core covered by a thin flexible sheet material, and wherein mating hook and loop type fastener strips are carried, respectively by said foot section at the end thereof proximate to the patient mover and to one of said top and bottom thin flexible sheets at the foot end of the air pallet type patient mover.

* * * * *